(12) United States Patent
Kurdy

(10) Patent No.: US 9,308,810 B1
(45) Date of Patent: Apr. 12, 2016

(54) ELECTRIC VEHICLE CONVERSION KIT

(75) Inventor: Tarek Kurdy, Los Angeles, CA (US)

(73) Assignee: Tarek Kurdy, Torrance, CA (US)

( * ) Notice: Subject to any disclaimer, the term of this patent is extended or adjusted under 35 U.S.C. 154(b) by 858 days.

(21) Appl. No.: 13/071,485

(22) Filed: Mar. 24, 2011

Related U.S. Application Data

(60) Provisional application No. 61/318,213, filed on Mar. 26, 2010.

(51) Int. Cl.
*B60K 7/00* (2006.01)

(52) U.S. Cl.
CPC ........................................ *B60K 7/00* (2013.01)

(58) Field of Classification Search
CPC .............. B60K 2007/0092; B60K 2007/0038; B60K 7/0007; B60L 2220/44; B60L 2220/46; B60L 2220/50; H02K 7/006
USPC ................................. 180/65.21, 65.25, 65.51
See application file for complete search history.

(56) References Cited

U.S. PATENT DOCUMENTS

| 2,842,307 | A | * | 7/1958 | Spear .................... F04D 25/166 415/126 |
| 4,393,319 | A | * | 7/1983 | Bock ........................ H02K 7/06 310/156.12 |
| 5,678,646 | A | | 10/1997 | Fliege |
| 6,767,155 | B2 | * | 7/2004 | O'Brien et al. ......... F16B 21/16 244/173.1 |
| 7,556,112 | B2 | | 7/2009 | Suzuki et al. |
| 7,621,357 | B2 | | 11/2009 | Suzuki et al. |
| 7,681,676 | B2 | | 3/2010 | Kydd |
| 2005/0205313 | A1 | | 9/2005 | Gilmore et al. |
| 2006/0000650 | A1 | | 1/2006 | Hughey |
| 2008/0169140 | A1 | * | 7/2008 | Perry .................... B60K 7/0007 180/65.51 |
| 2008/0308328 | A1 | * | 12/2008 | Kejha ........................... 180/65.2 |
| 2009/0000836 | A1 | * | 1/2009 | Kydd ........................... 180/65.2 |
| 2009/0127008 | A1 | | 5/2009 | Batdorf |
| 2009/0223725 | A1 | | 9/2009 | Rodriguez et al. |
| 2011/0079453 | A1 | * | 4/2011 | Wanger et al. .................. 180/11 |

* cited by examiner

*Primary Examiner* — Bryan Evans

(57) ABSTRACT

An automotive vehicle is retrofitted with an electric motor attached to a drive wheel to convert the vehicle into an electric vehicle. The automotive vehicle has at least one axle mounted drive wheel and the electric motor is coaxially mounted on this axle to rotate the drive wheel. An accelerator mechanism is operably connected to the electric motor to be manipulated to increase and decrease the revolutions of the drive wheel when power is provided to electric motor by an energy storage device carried by the vehicle. My electric vehicle may include a control unit for operation of the vehicle in a first mode where the internal combustion engine provides power to the drive wheel and a second mode where the electric motor provides power to the drive wheel. My kit includes the electric motor, the accelerator mechanism, and the control unit with instructions for retrofitting a conventional automotive vehicle in accordance with my method.

18 Claims, 15 Drawing Sheets

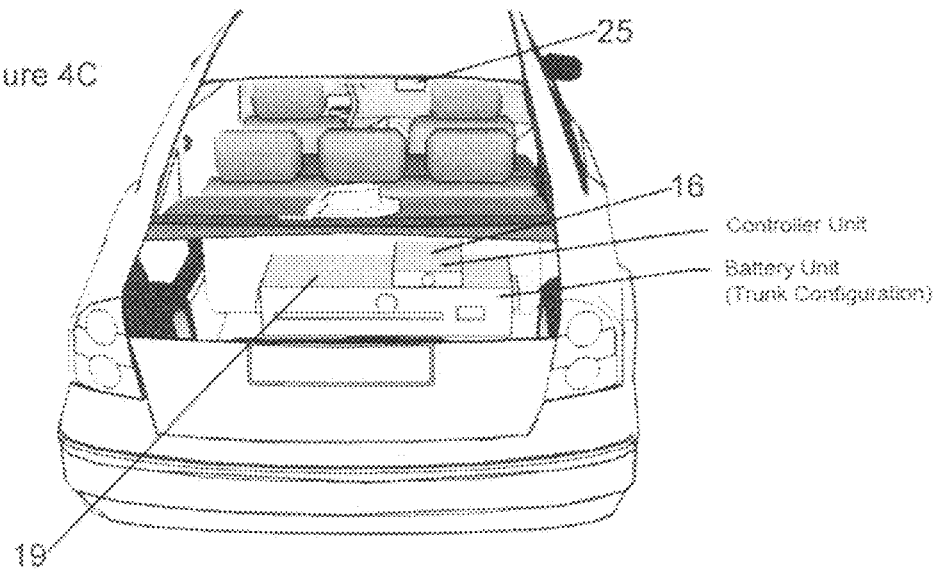
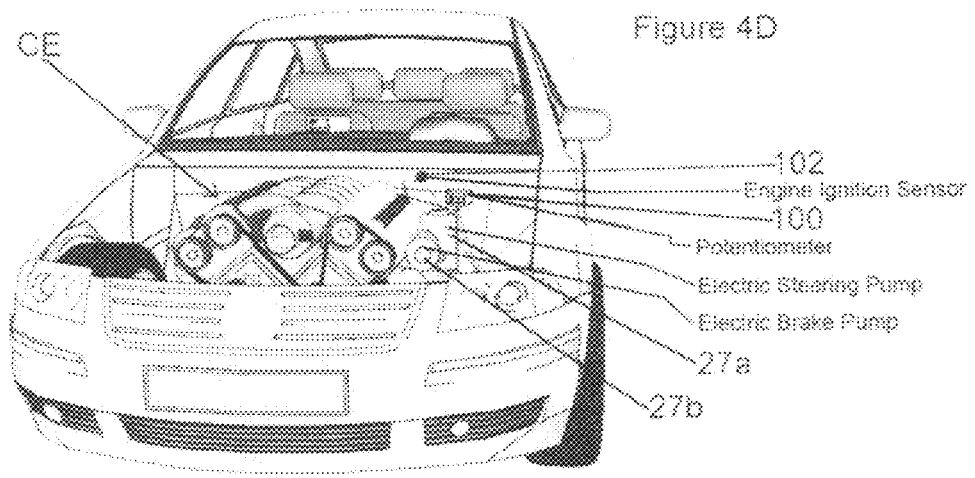

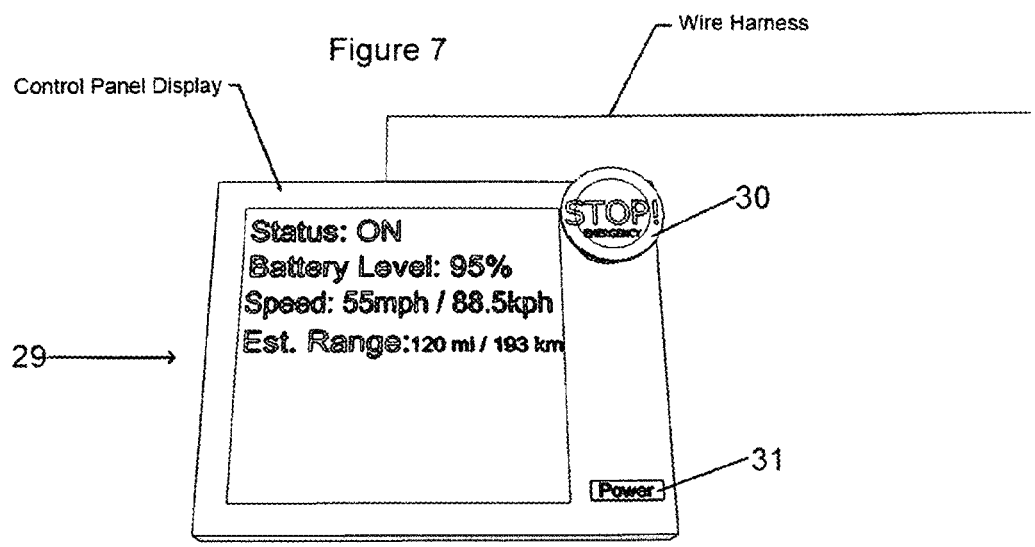
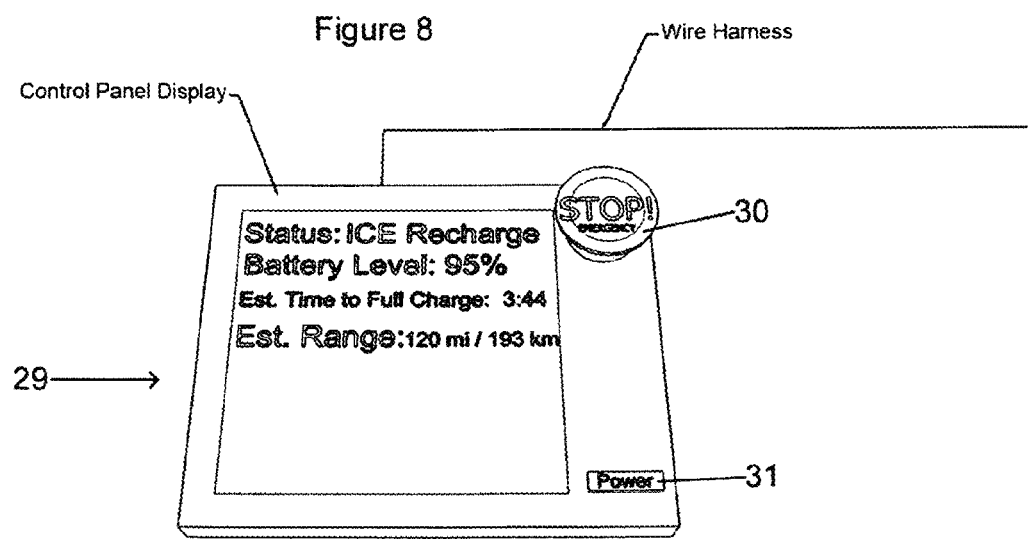

ELECTRIC VEHICLE CONVERSION KIT

RELATED PATENT APPLICATION & INCORPORATION BY REFERENCE

This utility application claims the benefit under 35 USC 119(e) of U.S. Provisional Patent Application No. 61/318,213, entitled "Electric Vehicle," filed Mar. 26, 2010. This related application is incorporated herein by reference and made a part of this application. If any conflict arises between the disclosure of the invention in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items.

The word "cable" includes any flexible and elongated cord, string, rope, wire or like device employing one or multiple strands of material. The words "substantially" and "essentially" have equivalent meanings.

The word "electric vehicle" includes a hybrid vehicle employing both an electric motor and an internal combustion engine.

The words "internal combustion engine" includes engine fueled by a carbon based liquid or gas.

BACKGROUND

With the introduction of wheel mounted electrical motors, it is now possible to provide to consumers a way to convert their conventional automotive vehicles powered by internal combustion engines into electric vehicles. The following are companies that make or use wheel mounted electrical motors: PML Flightlink <http://www.pmlflightlink.com/> a UK based company that currently designs and builds the highest power density electric wheel motors in the world (Currently working with Volvo on the ReCharge, a vehicle released at the 2007 Frankfurt Motor Show that uses 4 of PML's in-wheel motors.), E-traction <http://www.e-traction.com/> a Dutch-American company that has several wheel motors in production, the manufacturer of the Whisper, a serial hybrid bus with wheel hub motors. Tech-m4 <http://www.tm4.com/eng/tm4transport/moto wheelmotor/> a subsidiary of Hydro-Quebec <http://en.wikipedia.org/wiki/Hydro-Qu%C3%A9bec> a Canadian utility company <http://en.wikipedia.org/wiki/Public utility> that develops and produces wheel motors for automobiles.

This background discussion is not intended to be an admission of prior art.

SUMMARY

My method and kit enables the ordinary consumer or a professional mechanic to retrofit a conventional automotive vehicle with an in-wheel, an on-wheel, an inner wheel, or a within-wheel electric motor to convert the vehicle into a unique electric vehicle. My method, kit and electric vehicle have one or more of the features depicted in the embodiments discussed in the section entitled "DETAILED DESCRIPTION OF SOME ILLUSTRATIVE EMBODIMENTS." The claims that follow define my method, kit, and electric vehicle distinguishing them from the prior art; however, without limiting the scope of my method, kit and electric vehicle as expressed by these claims, in general terms, some, but not necessarily all, of their features are:

One, my electric vehicle includes a vehicle body including at least one drive wheel mounted to a drive axle. The drive wheel has a wheel-mounted electric motor mounted to the body of the vehicle, and the motor is powered by an energy storage device. Typically, the energy storage device is carried by the vehicle, and may be, for example, energized with electricity produced by a solar panel carried by the vehicle.

Two, my electric vehicle may have a first operating mode powered by an internal combustion engine and a second operating mode where the electric motor drives the vehicle. In the electric motor acts as a generator when the vehicle is in the first operating mode to charge the energy storage device. The energy storage device is rechargeable and can be charged from any standard AC or DC power source. The electric motor may be operable in a forward drive mode and a reverse drive mode, and the motor includes a switching system that enables a driver of the vehicle to operate the vehicle in the first mode and the second mode and to operate the electric motor in the forward drive mode and the reverse drive mode.

Three, my electric motor may be an in-wheel electric motor, an on-wheel electric motor, an inner-wheel electric motor, or a within-wheel electric motor. The electric motor is attached to an end of the axle adjacent the drive wheel, or drive wheel itself, and it may include a dampening system offsetting the weight of the electric motor. The same or different types of electric motors may be used on the same vehicle on some or all of the vehicle's wheels. The inner-wheel electric motor may include within it a locking mechanism.

Four, my electric vehicle includes an accelerator mechanism that is manually manipulated to increase and decrease the revolutions of the wheel when power is provided to the electric motor by the energy storage device. The vehicle may also include an electrically powered brake system, which may be regenerative breaking system, an electrically powered hydraulic fluid steering system, and an electrically powered hydraulic brake system.

Five, my electric vehicle may include a display mounted to the vehicle body in a manner to enable a driver of the vehicle to view the status of the power of the energy storage device and the predicted range of the vehicle before recharging of the energy storage device is required. The display typically shows the speed of the vehicle.

Six, the electric vehicle may include only a pair of wheels in line and each mounted on the body to be rotated, one of the pair being the wheel including the electric motor. The electric vehicle may include a pair of front wheels each mounted on the body to be rotated and a pair of rear wheels each mounted on the body to be rotated. The rear wheels may each include an electric motor powered by the rechargeable energy storage device. The each of the front wheels may include an electric motor powered by the rechargeable energy storage device.

The different embodiments of my kits include the components for converting an automotive vehicle with at least one drive axle mounted drive wheel into an electric vehicle my means of a wheel or axle mounted electric motor, and my method includes the steps of coaxially mounting an electric motor on an end of the axle or to wheel itself to rotate said drive wheel, operably connecting the electric motor to an energy storage device carried by the vehicle, operably attaching an accelerator mechanism between the energy storage device and the electric motor, and positioning said accelerator mechanism to be manually manipulated to increase and decrease the revolutions of the wheel when power is provided by the energy storage device to the electric motor.

These features are not listed in any rank order nor is this list intended to be exhaustive.

DESCRIPTION OF THE DRAWING

Some embodiments of my method, kit and electric vehicle are discussed in detail in connection with the accompanying drawing, which is for illustrative purposes only. This drawing includes the following figures (Figures), with like numerals indicating like parts:

FIG. 1' is a perspective view of one embodiment of my kit for an on-wheel electric motor conversion system.

FIG. 1" is a perspective view of one embodiment of my kit for an inner-wheel electric motor conversion system.

FIG. 1''' is a perspective view of one embodiment of my kit for a within-wheel electric motor conversion system.

FIG. 4C is a rear perspective view of my electric vehicle shown in FIG. 4A with the rear vehicle wall removed to show the energy storage device unit and control unit.

FIG. 4D is a front perspective view of my electric vehicle shown in FIG. 4A with the hood of the vehicle removed to show the vehicle's internal combustion engine.

FIGS. 7 through 9 depict a display mounted in a manner to enable a driver of the vehicle to view the speed of the vehicle, the status of the power of the vehicle's energy storage device, etc., and the predicted range of the vehicle before recharging of the energy storage device is required.

FIG. 11 is an exploded perspective view of an inner-wheel electric motor depicting its locking mechanism disengaged.

DETAILED DESCRIPTION OF SOME ILLUSTRATIVE EMBODIMENTS

General

Figure 1:
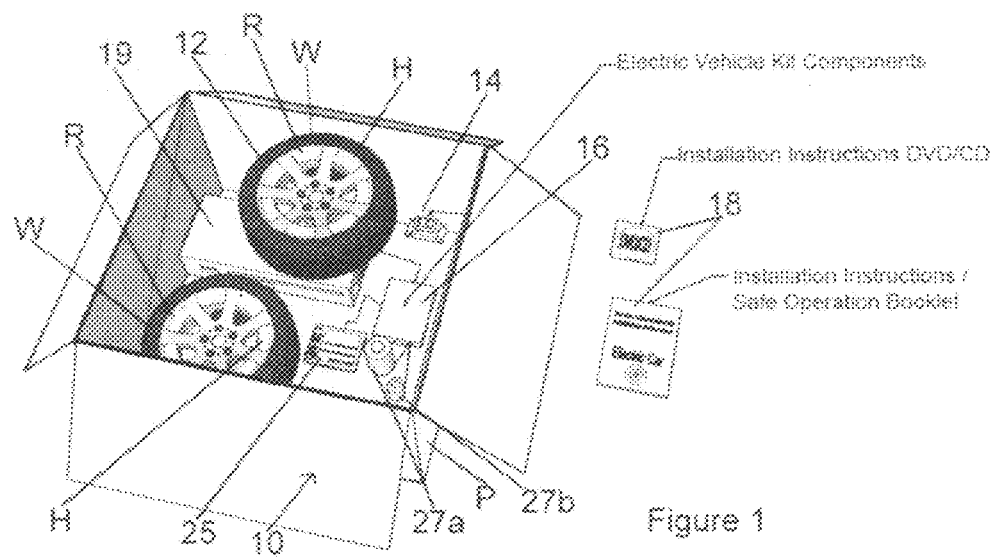
FIG. 1 is a perspective view of one embodiment of my kit for an in-wheel electric motor conversion system.
Figure 1:
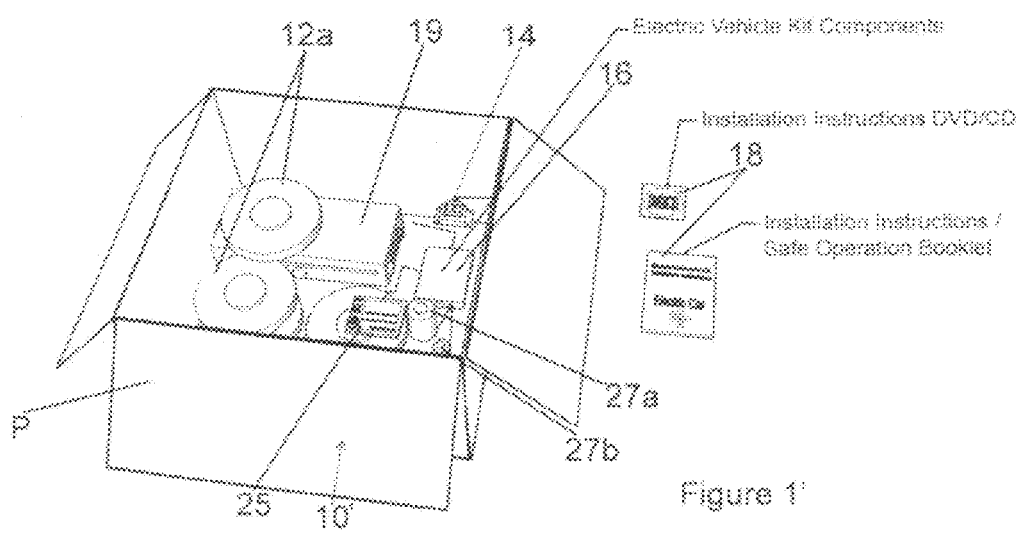
Figure 1:
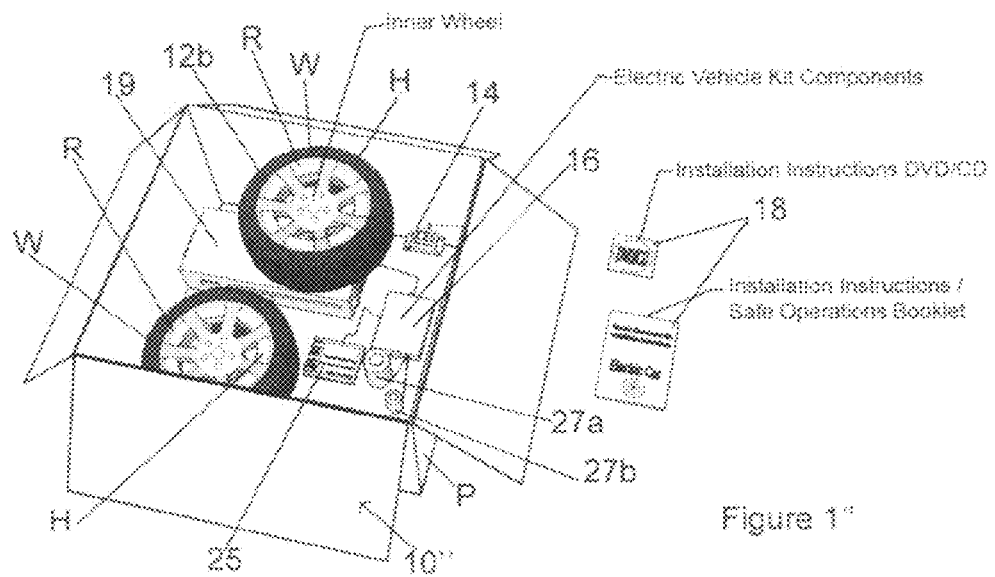
Figure 1:
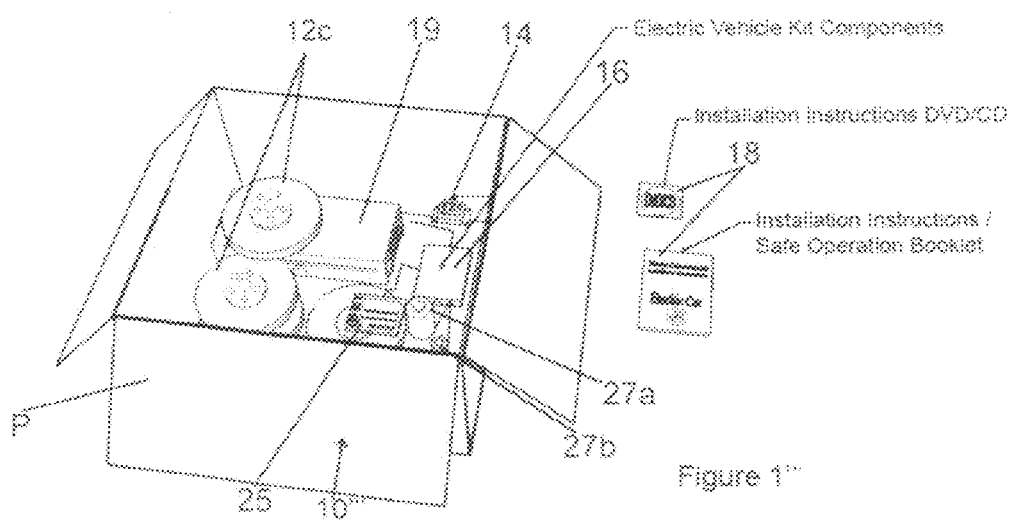

Four embodiments of my kit are depicted. The kit designated by the numeral 10 and illustrated in FIG. 1 is for converting a conventional vehicle using an internal combustion engine CE into an electric vehicle having in-wheel electric motors. The kit designated by the numeral 10' and illustrated in FIG. 1' is for converting a conventional automotive vehicle using an internal combustion engine CE into an electric vehicle having on-wheel electric motors. The kit designated by the numeral 10" and illustrated in the FIG. 1" is for converting a conventional automotive vehicle using an internal combustion engine CE into an electric vehicle having an inner-wheel electric motor. The kit designated by the numeral 10''' and illustrated in the FIG. 1''' is for converting a conventional automotive vehicle using an internal combustion engine CE into an electric vehicle having a within-wheel electric motor. My kits 10, 10', 10" and 10''' enable an ordinary consumer to retrofit a conventional automotive vehicle and convert it into an electric vehicle.

The kits 10 and 10' each includes a pair of assembled wheels W. In kit 10 each wheel W includes an in-wheel electric motor 12 installed within the rim R of the wheel's hub H. The kit 10' employs an on-wheel electric motor, the kit 10" an inner-wheel electric motor, and the kit 10''' a within-wheel electric motor. The consumer who uses my kit 10 simply replaces drive wheels of a conventional automotive vehicle he or she is converting into an electric vehicle with the wheels W Or, when using kits 10" and 10''' installs the on-wheel or within-wheel electric motors directly on the axle or On or Within the standard vehicle wheel itself. My kit 10 also includes an accelerator mechanism 14, a controller unit 16, and instructions 18 for retrofitting an automotive vehicle in accordance with my method. The instructions 18 may be, for example, a printed hard copy document, a video, or compact disk CD explaining my method of converting an automotive vehicle into an electric vehicle. These components of my kit 10 may be contained within any suitable packaging P such as, for example, a box. The kit 10' is essentially the same as that of kit 10, but instead of the wheels W, the kit 10' includes a pair of on-wheel electric motors 12a (FIG. 10) that are simply mounted to opposed ends of a drive axle. The kit 10" is essentially the same as that of kit 10, but instead, the kit 10" includes a pair of inner-wheel electric motors 12b (FIGS. 11-11C). The kit 10''' is essentially the same as that of kit 10, but instead, the kit 10''' includes a pair of within-wheel electric motors 12c (FIGS. 12 and 12A).

The conventional automotive vehicle to be converted into my electric vehicle has at least one drive axle to which is mounted at least one drive wheel. The vehicle's internal engine through a gear train rotates the drive axle and it rotates the vehicle's drive wheel. Numerous different types of conventional automotive vehicles may be converted into an electric vehicle according to my method, for example, two, three, four or more wheel vehicles. My method comprises equipping the vehicle with an electric motor mounted coaxially directly at an end of the drive axle. The motor may be within the drive wheel, on the drive wheel, or part of the wheel itself.

As shown in FIG. 1, the in-wheel electric motor 12 is coaxially mounted to the wheel W. Upon converting a vehicle, this wheel W will replace the vehicle's drive wheel. It may be detachably mounted on the drive axle directly at an end of the axle to rotate the drive wheel. The in-wheel electric motor 12 is built into a standard wheel that fits onto any standard vehicle without any customization or adjustment needed, allowing space for the standard vehicle's existing brakes and other components. The in-wheel electric motor 12 is housed within, or is part of, the wheel structure and does not obstruct any of the standard vehicle components normally connected to the wheel. In contrast as shown in FIG. 1, the on-wheel electric motor 12a is designed to be attached to the exterior of an existing drive wheel W2, and may be disk shaped and quite thin, having a thickness t (FIG. 10) that does not exceed about 5 inches.

The accelerator mechanism 14 is operably connected to the electric motor 12, 12a, 12b, or 12c as the case may be, to be manually manipulated by a driver of the vehicle to increase and decrease the revolutions of the drive wheel when power is provided to the electric motor 12, 12a, 12b or 12c, as the case may be, by an energy storage device 19 carried by the vehicle. The energy storage device 19 is in addition to the conventional 12-volt car energy storage device 19a (FIG. 6) and this energy storage device 19 may be of the type that can be charged from a standard AC or DC electrical power source. The vehicle uses a controller unit 16 for operational control of my electric vehicle. In one embodiment, my vehicle is a hybrid, operating in a first mode where an internal combustion engine of the conventional vehicle provides power to the drive wheel and a second mode where the electric motor 12 provides power to the drive wheel. The electric motor acts as a generator when the vehicle is in the first operating mode to charge the energy storage device 19.

The electric motor also has regenerative breaking capability, which may work independently or in conjunction with the vehicle's mechanical breaking system. The electric motor may also include its own dampening system to offset added weight of the motor to the wheel as shown in FIG. 12A. The electric motor may also include internal gearing system to improve performance while driving up incline or various road conditions. The electric motor may also be lightweight to minimize decrease in performance due to wheel weight.

My kit 10 may include additional components for my electric vehicle such as, for example, a user interface display 25 (FIGS. 7, 8, and 9) and an electric power hydraulic fluid steering pump 27a and an electric power brake 27b. Using my kit enables the ordinary consumer to convert a conventional automobile into either (a) a hybrid electric vehicle which is powered by both an electric motor and an internal combustion engine or (b) remove or otherwise disable the conventional automobile's internal combustion engine so the vehicle is solely powered by electrical energy from the energy storage device 19.

Figure 1A:
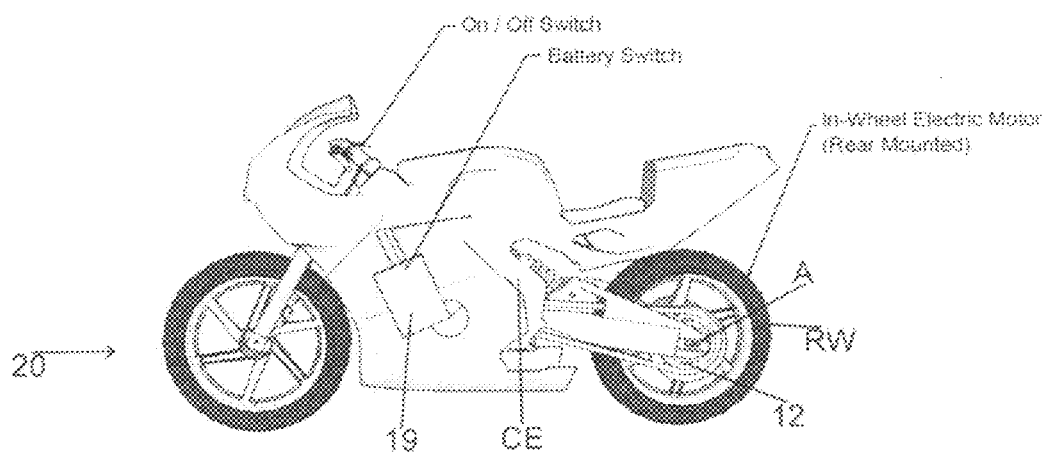
FIG. 1A is a side view of one embodiment of my electric vehicle, a motorcycle with its rear wheel operably connected to an in-wheel electric motor.
Figure 1B:
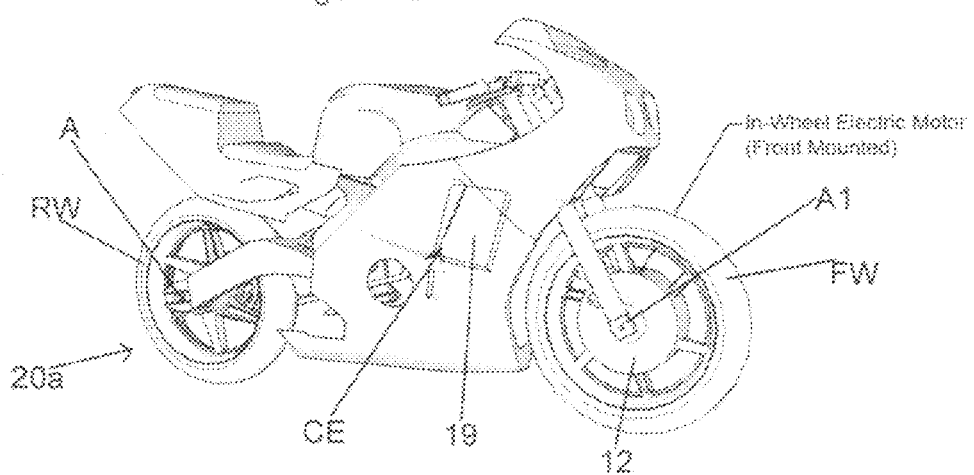
FIG. 1B is a side view of another embodiment of my electric vehicle, a motorcycle with its front wheel operably connected to an in-wheel electric motor.
Figure 1C:
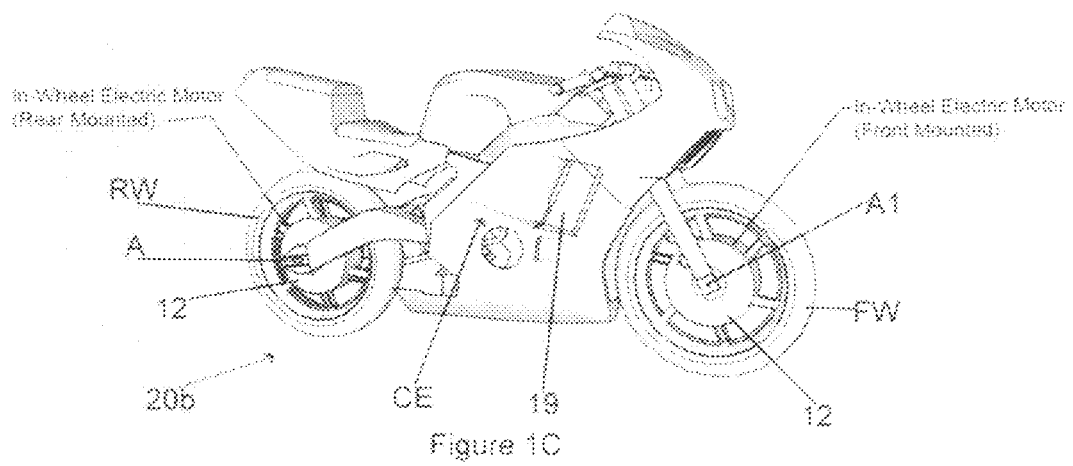
FIG. 1C is a side view of one more embodiment of my electric vehicle, a motorcycle with both its front and rear wheels each operably connected to an in-wheel electric motor.

FIGS. 1A through 1C

FIGS. 1A through 1C show respectively different embodiments of a conventional motorcycle retrofitted to convert the motorcycles into electric vehicles. These embodiments are respectively designated by the numerals 20, 20a and 20b. As illustrated in FIG. 1A, the motorcycle 20 has the in-wheel electric motor 12 mounted to its rear axle A that carries a rear wheel RW that functions as a drive wheel when powered by either the motorcycle's internal combustion engine CE or the electric motor 12. As illustrated in FIG. 1B, the motorcycle 20a has the electric motor 12 mounted to its front axle A1 and its front wheel FW functions as a drive wheel when powered by either the motorcycle's internal combustion engine CE or the electric motor 12. As illustrated in FIG. 1C, the motorcycle 20b has electric motors 12 mounted to both the front axle A1 and the rear axle A. The control unit is mounted on the back of the vehicle.

FIGS. 2 through 6

Figure 2:
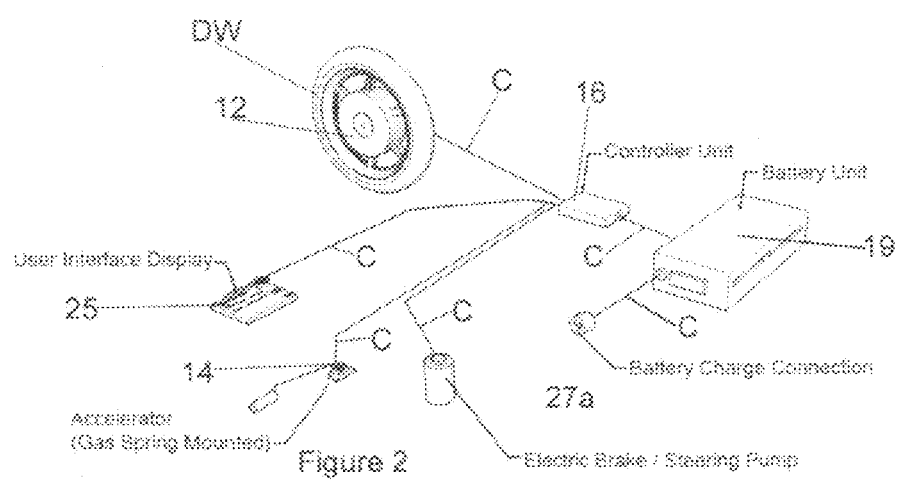
FIG. 2 is a schematic diagram of one embodiment of my kit with its the components assembled to convert a conventional motorcycle into either one of the embodiments of my electric vehicle such as depicted in FIGS. 1A, 1B, and 1C.
Figure 3:
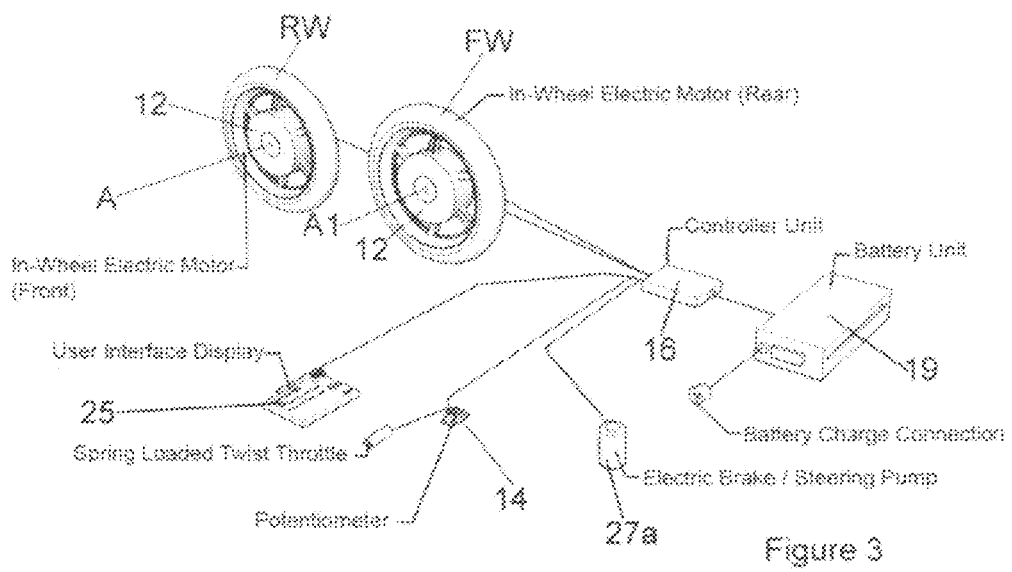
FIG. 3 is a schematic diagram of one embodiment of my kit with its components assembled to convert a conventional motorcycle into the embodiment of my electric vehicle such as depicted in FIG. 1C.

FIGS. 2 through 4E illustrate different embodiments of conventional vehicles converted into electric vehicles using my method and kits. FIG. 2 depicts a vehicle such as a conventional motorcycle converted into my electric vehicle like that of the motorcycles 20 and 20a having only a single drive wheel DW, either front or rear axle mounted. The electrical components of the kit 10 are operably connected by conductive cables C as shown in FIG. 2, and the electric motor 12, which in this embodiment is an in-wheel electric motor, is mounted on an end of the axle A or A1, as the case may be. Power from the energy storage device 19, typically a 100-950 volt battery, is supplied to the electric motor 12 under the control of the accelerator mechanism 14. Provided the control unit 16 has been actuated by the driver of the vehicle, the electric motor 12 provides power to the drive wheel DW. Manual actuation by the driver of the accelerator mechanism 14 increases or decreases the rotational speed of the drive wheel DW to increase or decrease the velocity of the electric vehicle. An electrically powered breaking system 27c with an electric brake pump 27b are also operable. Also included is an electric power steering pump 27a.

Figure 4:
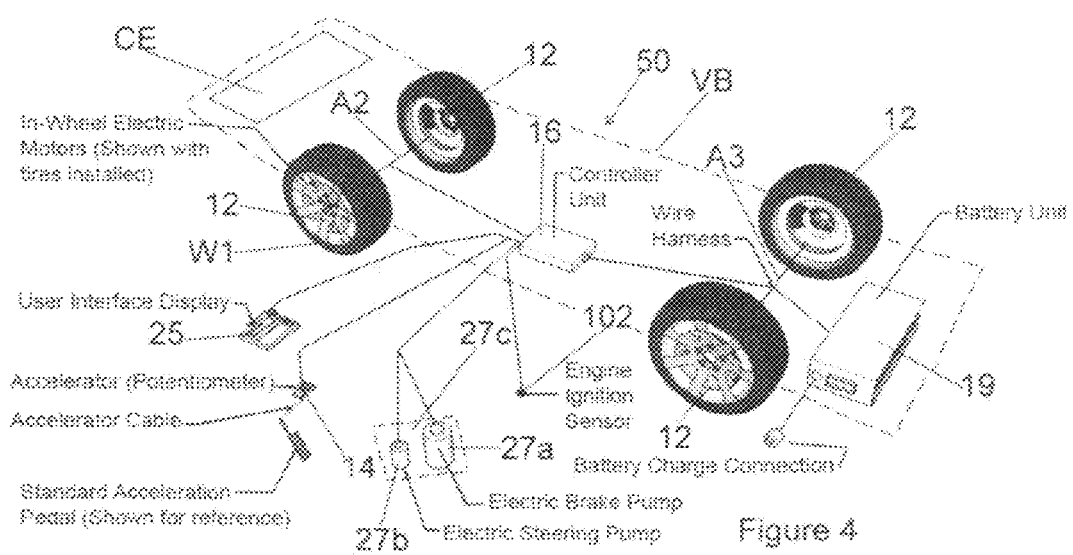
FIG. 4 is a schematic diagram of one embodiment of my kit with the components assembled to convert a conventional four-wheel vehicle into still another embodiment of my electric vehicle.
Figure 4A:
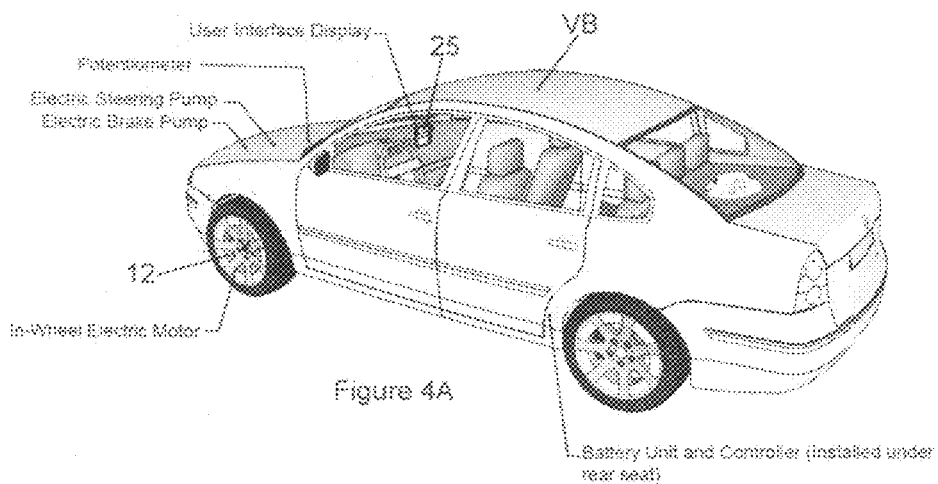
FIG. 4A is a perspective view of one embodiment of my electric vehicle.
Figure 4B:
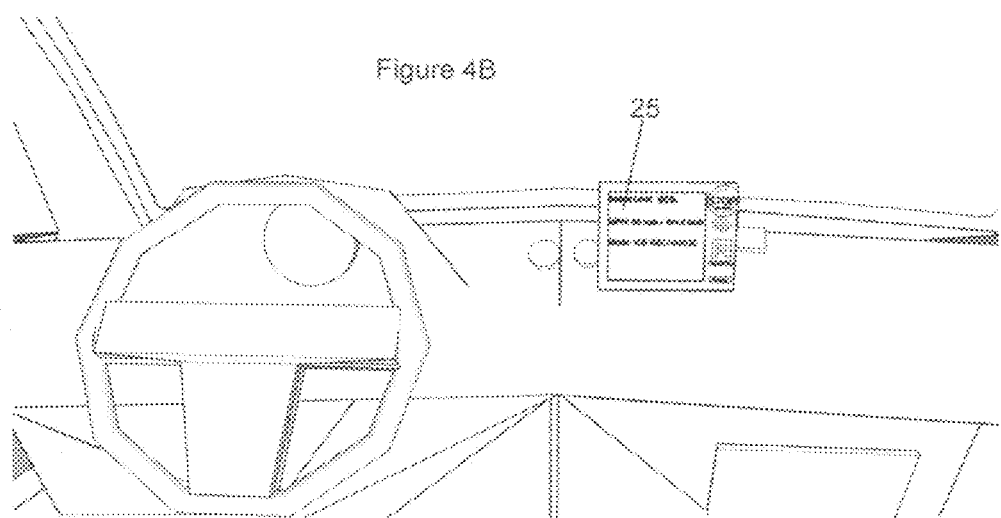
FIG. 4B is a fragmentary view looking through the front window from the front seat of my electric vehicle shown in FIG. 4A illustrating a display unit.
Figure 4E:
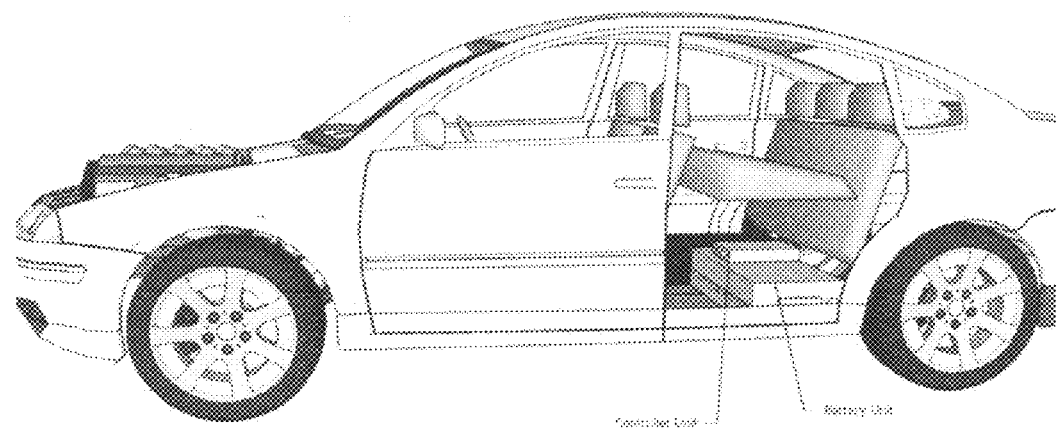
FIG. 4E is a side view of my electric vehicle shown in FIG. 4A with the vehicle's rear side door removed to show the energy storage device unit and control unit.

FIG. 4 depicts a conventional four-wheel vehicle converted into another embodiment of my electric vehicle designated by the numeral 50. My electric vehicle 50 has front axle A2 and rear axle and A3, with a pair of wheels W1 (only one shown) mounted on opposed ends of the front axle and another pair of wheels mounted on opposed ends of the rear axle. In a kit there may be only a pair of wheels with electric motors 12 therein, one wheel mounted to each opposed end of the rear axle A3. Alternately, a kit may include a second pair of wheels with electric motors 12 therein, each additional wheel mounted to each opposed end of the front axle A2 as depicted in FIG. 4. The electrical components of the kit 10 are operably connected by conductive cables C as shown in FIG. 4.

Figure 5:
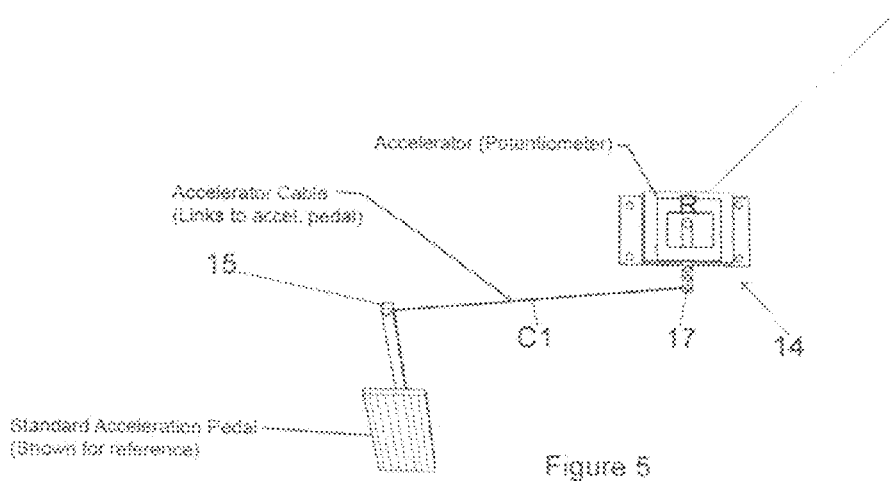
FIG. 5 is a schematic diagram of an alternate embodiment of an accelerator mechanism used with my electric vehicle.

As shown in FIG. 5, the accelerator mechanism 14 may be a potentiometer 100 (FIG. 4D) including a resister R having a lever 17 that is manually manipulated by the driver of the vehicle through a cable C1 that has a control arm 15 within the vehicle body VB.

Figure 6:
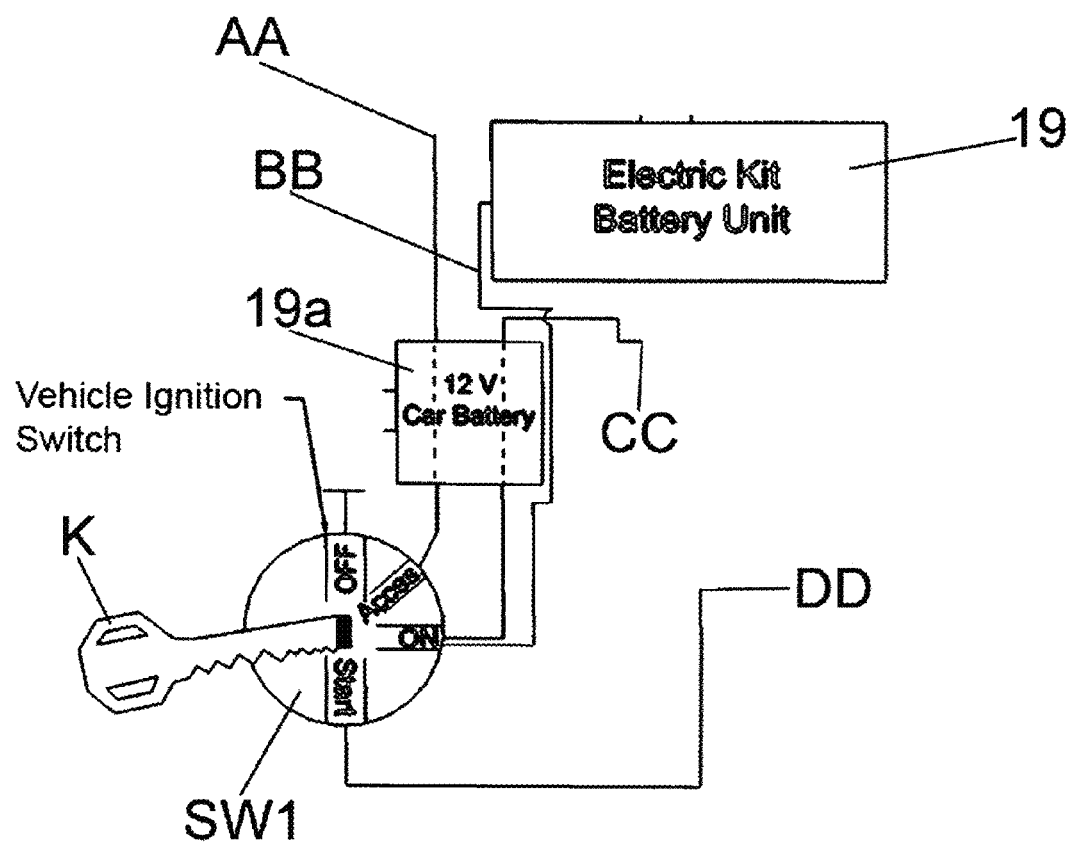
FIG. 6 is a schematic diagram showing switching the operation of the vehicle between a first mode where an internal combustion engine provides power to a drive wheel of the vehicle and a second mode where the electric motor(s) provides power to the drive wheel.

As shown in FIG. 6, the vehicle's conventional starter control is operated by the vehicle's starter key K. The starter key K is inserted into the ignition switch SW1, which has electrical connection to the vehicle's standard energy storage device 19a through the circuits AA and CC and the through the circuit BB to the rechargeable energy storage device 19. The starter key K and ignition switch SW1 have an OFF, ACCESSORIES, ON, and START positions. The driver rotates the key K clockwise and counter-clockwise between positions as desired to operate my vehicle as discussed subsequently.

Figure 9:
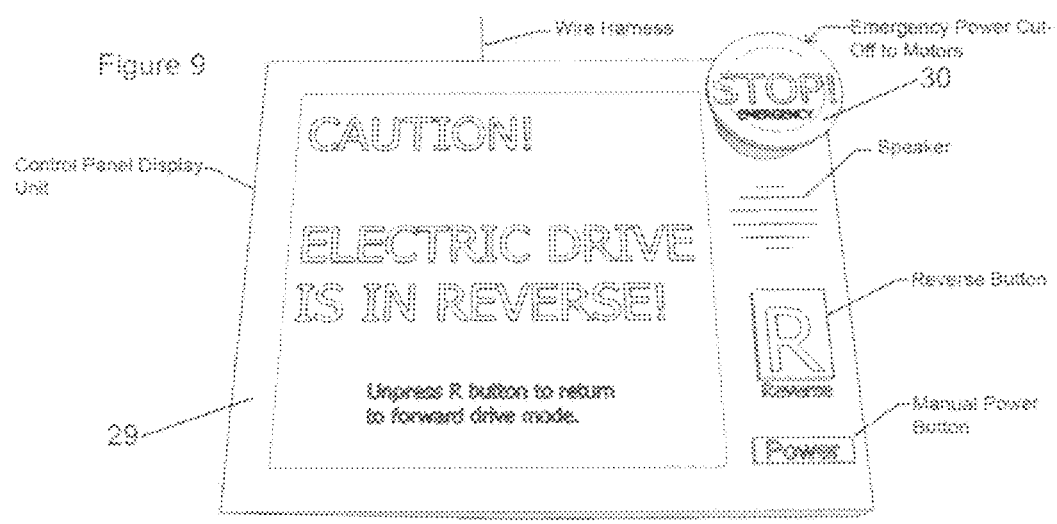

FIGS. 7 through 9

As illustrated in FIGS. 7 through 9, my electric vehicle includes the display 25 mounted to the vehicle body VB in a manner to enable a driver of the vehicle to view the status of the power of the energy storage device 19 and the predicted range of my vehicle before recharging of the energy storage device is required. The display 25 has associated with it a manually operated emergency stop button 30 to stop the vehicle when depressed, for example, if the electric power steering pump 27a malfunctions, or if the electrically powered brake system 27c fails because the electric power brake pump 27b malfunctions. When my vehicle is being powered by the energy storage device 19, light emitting diodes or a liquid crystal display may be used to show vehicle conditions, and an illuminated power button 31 is used to manually power on and off the electric kit. As shown in FIG. 7 the display 25 shows: STATUS, ENERGY STORAGE DEVICE LEVEL, SPEED, ESTIMATED RANGE; in FIG. 8 the display additional shows: ESTIMATED TIME TO FULL CHARGE; and in FIG. 9 the display shows: ELECTRIC DRIVE IN REVERSE and the display includes a light indicting the reverse gear is engaged and has a speaker providing an audio alert warning.

FIG. 10

Figure 10:
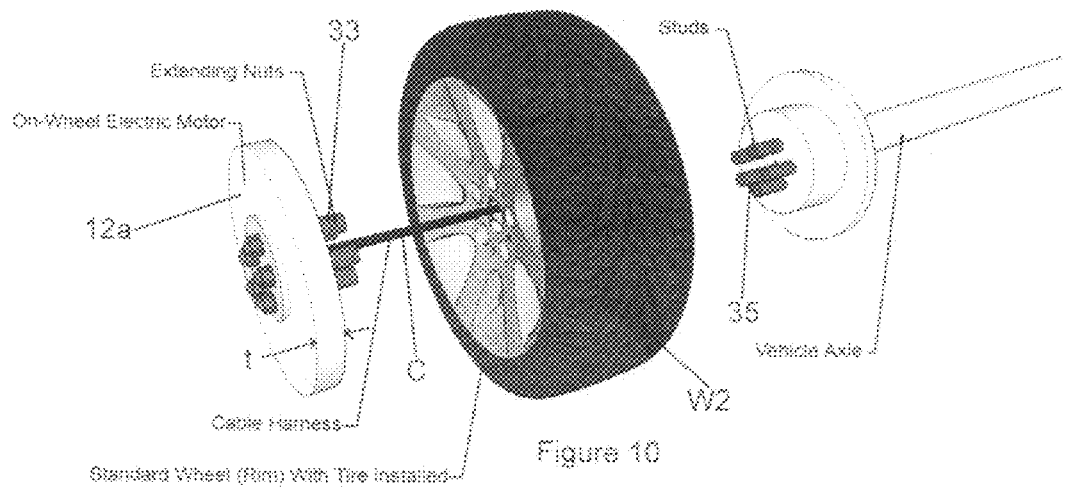
FIG. 10 is a perspective view of an on-wheel electric motor being mounted to the hub of a wheel of an automotive vehicle.

As illustrated in FIG. 10, the on-wheel electric motor 12a is fixed to the exterior of the wheel W2 by attaching extended nuts 33 to the studs 35 on the vehicle axle rotor (not shown). The nuts 33 are first put through the on-wheel electric motor 12a and then screwed onto the studs 35 on the vehicle axle rotor. This secures the wheel W2 to the rotor and the electric motor 12a to the wheel. These on-wheel electric motors 12a are rugged so they can endure accidental shock caused by the wheel hitting curbs when parallel parking or turning corners.

FIG. 11

Figure 11A:
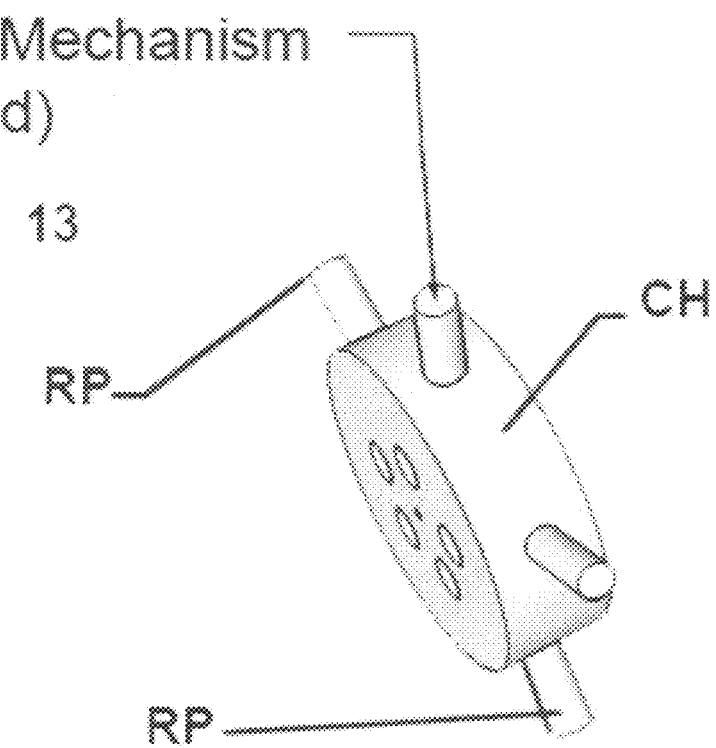
FIG. 11A is a perspective view of the locking mechanism depicted in FIG. 11 engaged.
Figure 11B:
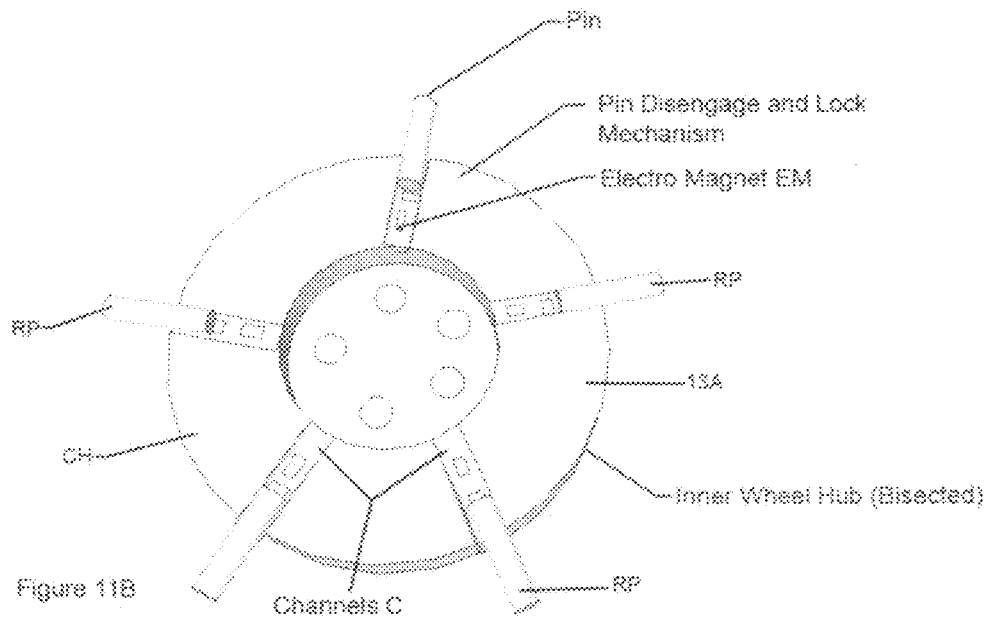
FIG. 11B is a perspective view of one embodiment of the locking mechanism.
Figure 11C:
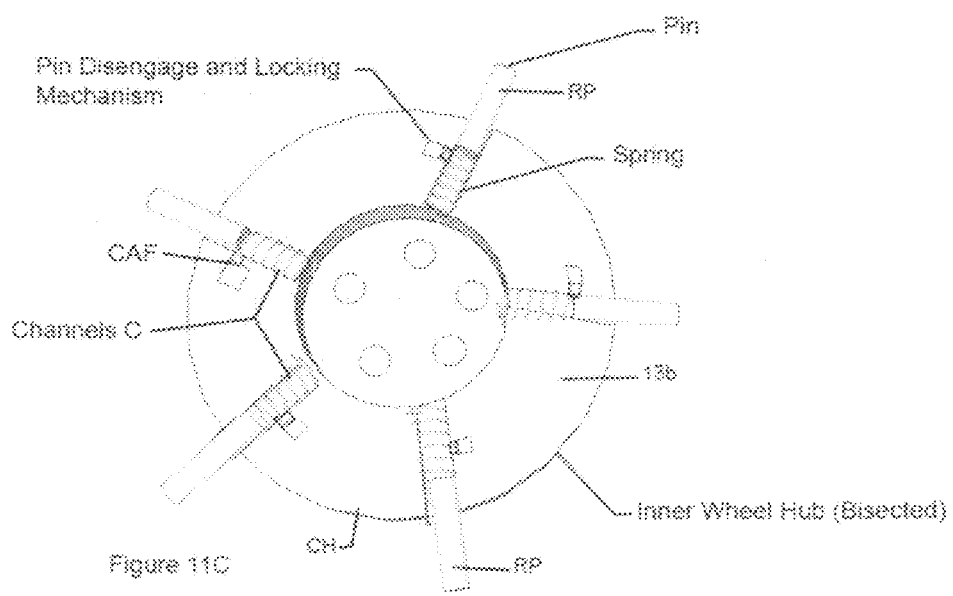
FIG. 11C is a perspective view of another embodiment of the locking mechanism.
Figure 12:
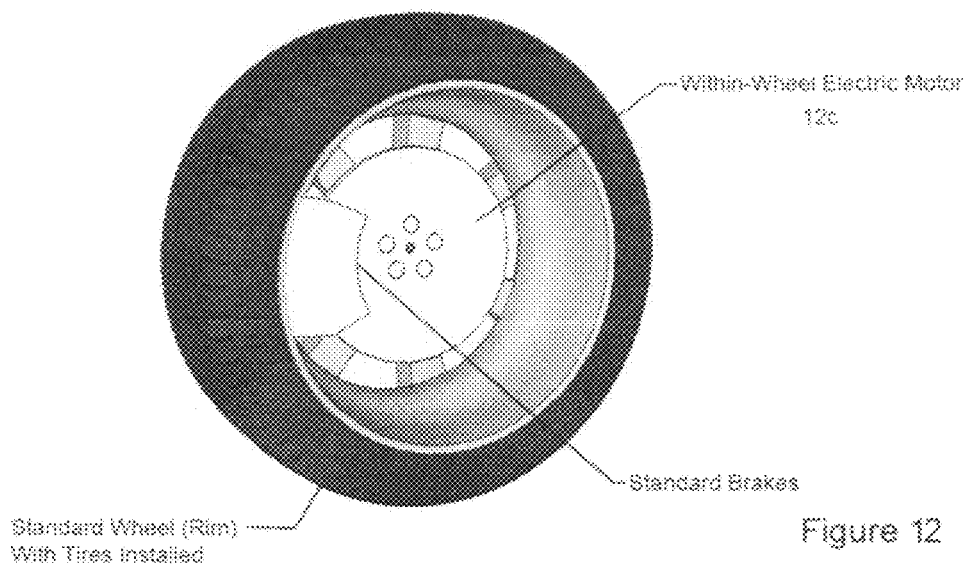
FIG. 12 is a perspective view of a within-wheel electric motor fitting within a standard vehicle wheel and looking at the interior of the standard vehicle wheel.
Figure 12A:
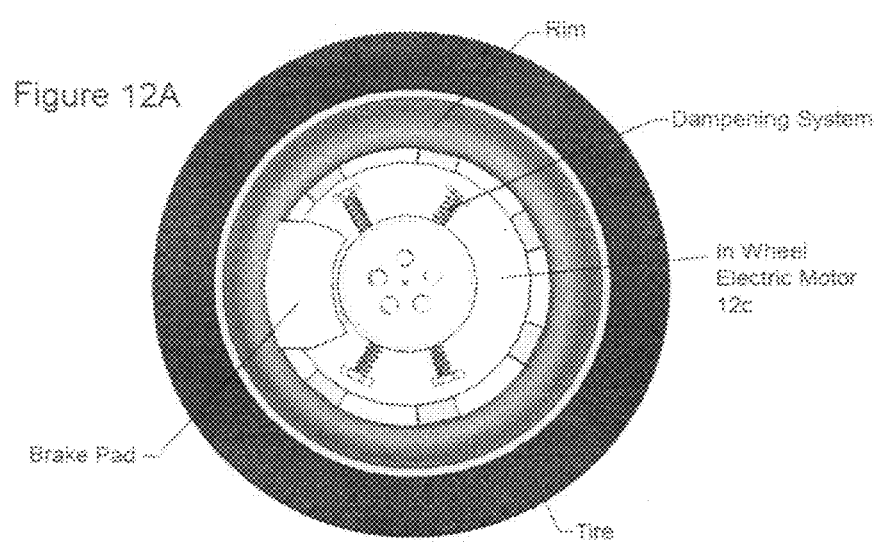
FIG. 12A is a perspective view of the within-wheel electric motor shown in FIG. 12 equipped with a dampening system.

As best illustrated in FIGS. 11 through 11B, the inner-wheel electric motor 12b is built into the vehicle's axle and has a locking mechanism 13 enabling the vehicle to operate under two modes. In one mode the locking mechanism 13 is engaged (FIG. 11A), and in its second mode the locking mechanism is disengaged (FIG. 11). The locking mechanism 13 may comprising a plurality of radial pins RP mounted to move linearly along channels C with a circular housing CH holding the motor components that when engaged project outward to couple with the wheel, so as power is applied to the inner-wheel electric motor 12b the wheel rotates. In other words, with the locking mechanism engaged the inner-wheel electric motor 12b rotates in conjunction with the tire of the vehicle. The inner-wheel electric motor 12b is shown in dotted lines exploded away from attachment to the hub at the end of the vehicle axle and with the locking mechanism disengaged. When the locking mechanism is disengaged, the vehicle's tire rotates independently of the inner-wheel electric motor 12b, which is carried by the axle as the axle is driven by the internal combustion engine.

There are two embodiments of the locking mechanism illustrated: In FIG. 11B a locking mechanism is depicted where the radial pins RP are moved in and out radially upon operation of an electro-magnet EM. In FIG. 11A a locking mechanism is depicted where the radial pins RP are moved in and out radially upon operation of a mechanical mechanism, such as a cam actuated finger CAF of the outer wheel or in conjuction with the outer wheel.

Figure 13:
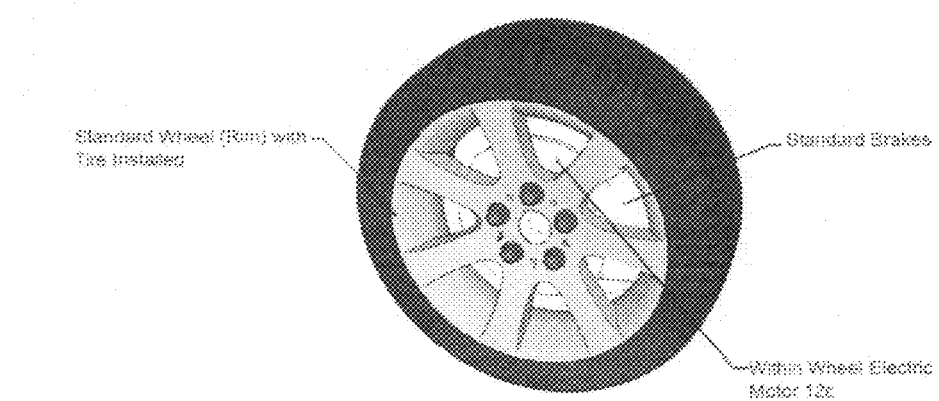
FIG. 13 is a perspective view of the within-wheel electric motor shown in FIG. 12 and looking at the exterior of the standard vehicle wheel.

FIGS. 12 and 13

As illustrated in FIGS. 12 and 13, the within-wheel electric motor 12c is separate from the wheel and fitted into a standard wheel that fits onto any standard vehicle without any customization or adjustment needed, allowing space for the standard vehicle's existing brakes and other components. This motor is fitted inside a standard vehicle rim without obstructing and standard wheel components such as breaks. The within-wheel electric motor 12c is on the inside of the rim underneath the brake pad and attached to the end of the vehicle's axle.

FIG. 14

Figure 14:
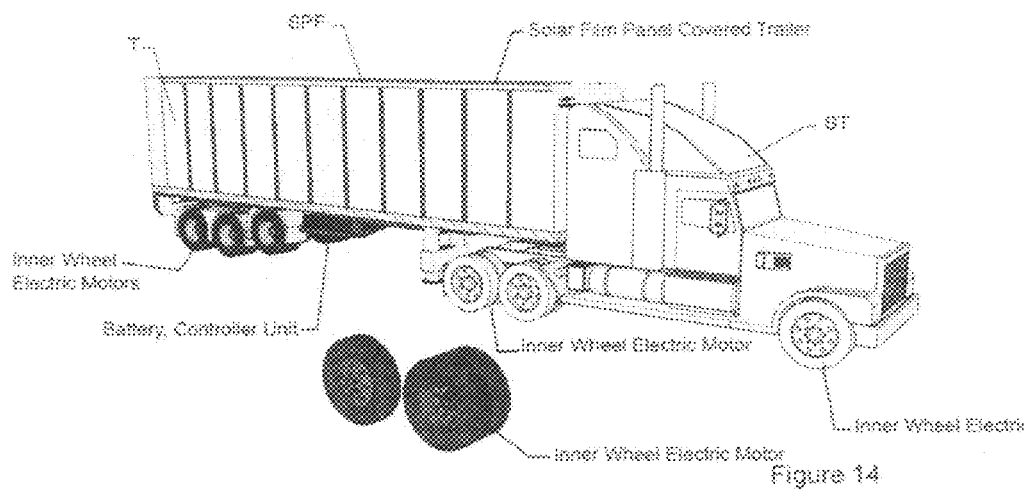
FIG. 14 is of the inner-wheel, on-wheel, in-wheel or within-wheel electric motor illustrated in FIGS. 1 through 12A installed on at least some of the wheels of a truck.

FIG. 14 shows how the in-wheel, on-wheel, inner-wheel, and within-wheel electric motors discussed above may be installed on the conventional wheels of a semi-truck ST and trailer T. The exposed exterior of the roof of the trailer is suited to carry a solar panel film SPF for recharging the energy storage device.

Operation of the Vehicle

In an embodiment where the combustion engine is disabled, there is only a single operational mode, for example, if the combustion engine CE of the motorcycle shown in FIG. 1A is disabled. Actuation of an on/off switch places the motorcycle in a mode where the energy storage device 19 provides power to the motorcycle.

In another embodiment where the combustion engine is not disabled, there are two operational modes: a first mode where the combustion engine CE drives the vehicle's drive axle and a second mode where the energy storage device through the in-wheel, on-wheel, inner-wheel, or within-wheel electric motor drives the vehicle's drive axle. Referring to FIG. 6, in the first mode the driver starts the combustion engine CE by turning the key K to the START position to activate the engine's starter motor by the energy storage device 19a. With the combustion engine CE running, the key K is in the ON position and the electrical components are powered by the energy storage device 19a.

To operate in the second mode, the driver will normally park the hybrid vehicle and shut down the combustion engine CE by turning the key to the OFF position. With the combustion engine CE shut down, the driver turns the key K to the ON or ACCESSORIES (depending on the vehicle ignition) position. The energy storage device 19 now provides power to the hybrid vehicle as discussed above. As depicted in FIG. 4D, there is an engine ignition sensor 102 nearby the combustion engine CE. This sensor 102 interacts with the control unit 16 to insure the electric motors 12, 12a, 12b or 12c as the case may be, and the combustion engine CE are not running concurrently. If the engine were to be turned on accidentally at any time while the electric motors are engaged, the sensor 102 will immediately detect this and disengage the electric motors 12, 12a, 12b or 12c, as the case may be.

The retrofitting of conventional vehicles may be provided through a conversion service offered by an existing retailer such as, for example, Best Buy. Also, a energy storage device leasing option may be provided with the kit in order to reduce overall cost of kit to the consumer.

Electric motors can be controlled by an accelerator attached via a cable, blue tooth, radio, laser, etc.

Scope of the Invention

The above presents a description of the best mode I contemplate of carrying out my method and kit, and of the manner and process of making and using them to convert a conventional vehicle into a unique electric vehicle, in such full, clear, concise, and exact terms as to enable a person skilled in the art to make and use. My method, kit and electric vehicle are, however, susceptible to modifications and alternate constructions from the illustrative embodiments discussed above which are fully equivalent. Consequently, it is not the intention to limit my method, kit and electric vehicle to the particular embodiments disclosed. On the contrary, my intention is to cover all modifications and alternate constructions coming within the spirit and scope of my method, kit and electric vehicle as generally expressed by the following claims, which particularly point out and distinctly claim the subject matter of my invention.

The invention claimed is:

1. A conversion kit, comprising:
   an electric powered motor adapted to be detachably mounted onto an existing wheel of an automotive vehicle to rotate said existing wheel,
   a locking component disposed on the electric powered motor, the locking component comprising a plurality of spring load radial pins disposed within a housing of the electric powered motor that are configured to project outward from the housing of the electric powered motor cause the electric powered motor to engage with the existing wheel,
   an accelerator component adapted to increase and decrease the revolutions of the existing wheel in response to power being provided to the electric powered motor,
   a connecting cable to couple the electric powered motor to the accelerator component,
   a control unit coupled to the accelerator component to operate the automotive vehicle under the power of the electric powered motor, and
   an energy storage device coupled to the control unit to provide the power for the electric powered motor.

2. The conversion kit of claim 1, wherein the electric powered motor is an in-wheel electric motor.

3. The conversion kit of claim 1, wherein the electric powered motor is an on-wheel electric motor.

4. The conversion kit of claim 1, wherein the electric powered motor is mounted onto an inner wheel assembly.

5. The conversion kit of claim 1 wherein the inner wheel assembly is detachably mounted within a portion of the existing wheel.

6. The conversion kit of claim 1, further comprising an electrically powered brake system attached to the control unit.

7. The conversion kit of claim 1, further comprising an electrically powered hydraulic fluid steering system attached to the control unit.

8. The conversion kit of claim 1, further comprising regenerative braking system attached to the control unit.

9. The conversion kit of claim 1, further comprising a dampening system coupled between an inner portion of the electric powered motor and the existing wheel, the dampening system to offset additional weight of the electric powered motor on the existing wheel.

10. The conversion kit of claim 1, further comprising display in communication with the electric powered motor, the display is adapted to present a status of the energy storage device associated with the electric powered motor and a predicted range of the electric powered motor before recharging of the energy storage device.

11. The conversion kit of claim 10, wherein the display is further adapted to present a speed of the automotive vehicle being powered by the electric powered motor.

12. The conversion kit of claim 1, further comprising switching device attached to the control unit that enables the motor vehicle to operate in a first mode, wherein a combustion engine associated with the motor vehicle is operable and a second mode, wherein the electric powered motor is operable.

13. The conversion kit of claim 1, further comprising instructions for retrofitting a conventional automotive vehicle.

14. The conversion kit of claim 1, wherein to detachably mount the electric powered motor, the existing wheel is not replaced.

15. The conversion kit of claim 1, further comprising extendable lug nuts coupled to the electric powered motor, the extendable lug nuts are configured to engage an axle hub associated with the automotive vehicle.

16. The conversion kit of claim 1, wherein the locking component further comprises an electro-magnet that is configured to move the radial pins in and out of the housing of the electric powered motor.

17. The conversion kit of claim 1, wherein the electric powered motor is adapted to be mounted onto an inner wall of the existing wheel.

18. The conversion kit of claim 1, wherein the energy storage device is rechargeable using a solar panel device.

* * * * *